US012610977B2

(12) United States Patent
Hara et al.

(10) Patent No.: US 12,610,977 B2
(45) Date of Patent: Apr. 28, 2026

(54) METHOD FOR REMOVING OUTER SKIN OF ONION AND DEVICE FOR REMOVING OUTER SKIN OF ONION

(71) Applicant: TAISEI DENKI CO., LTD., Saitama (JP)

(72) Inventors: Hirofumi Hara, Saitama (JP); Daizo Shiga, Saitama (JP); Akira Kubota, Saitama (JP); Kazuhide Matsuo, Saitama (JP); Ryu Wakamatsu, Saitama (JP); Noboru Kamishina, Saitama (JP)

(73) Assignee: TAISEI DENKI CO., LTD., Saitama (JP)

( * ) Notice: Subject to any disclaimer, the term of this patent is extended or adjusted under 35 U.S.C. 154(b) by 0 days.

(21) Appl. No.: 18/992,115

(22) PCT Filed: Jul. 19, 2023

(86) PCT No.: PCT/JP2023/026429
§ 371 (c)(1),
(2) Date: Jun. 13, 2025

(87) PCT Pub. No.: WO2024/038728
PCT Pub. Date: Feb. 22, 2024

(65) Prior Publication Data
US 2025/0295159 A1 Sep. 25, 2025

(30) Foreign Application Priority Data

Aug. 16, 2022 (JP) ................................. 2022-129650
Feb. 10, 2023 (JP) ................................. 2023-018828

(51) Int. Cl.
*A23N 15/08* (2006.01)
*A23L 5/20* (2016.01)
(Continued)

(52) U.S. Cl.
CPC ................ *A23N 15/08* (2013.01); *A23L 5/20* (2016.08); *B23K 26/38* (2013.01); *B23K 26/402* (2013.01)

(58) Field of Classification Search
None
See application file for complete search history.

(56) References Cited

U.S. PATENT DOCUMENTS

| | | | | | |
|---|---|---|---|---|---|
| 5,897,797 | A | * | 4/1999 | Drouillard | G06K 1/121 219/121.68 |
| 2006/0275027 | A1 | * | 12/2006 | Knijff | A23N 15/08 396/190 |
| 2011/0027432 | A1 | * | 2/2011 | Loeser | A23P 30/00 426/531 |

FOREIGN PATENT DOCUMENTS

| | | |
|---|---|---|
| EP | 0319240 A2 | 11/1988 |
| EP | 2281468 A1 | 2/2011 |

(Continued)

OTHER PUBLICATIONS

JP 2004344037 A (Miyata Hisanori) Dec. 9, 2004 [retrieved on Aug. 15, 2025]. Retrieved from Foreign Image and Text database, translation by Clarivate Analytics (Year: 2004).*

(Continued)

*Primary Examiner* — Edward F Landrum
*Assistant Examiner* — Theodore J Evangelista
(74) *Attorney, Agent, or Firm* — MASUVALLEY & PARTNERS; Peter Martinez

(57) ABSTRACT

The present invention provides a method for removing an outer skin of an onion and a device for removing an outer skin of an onion that can easily remove the outer skin of the onion and suppress damage to the edible part when the outer skin is removed. A method for removing an outer skin of an onion according to the present invention comprises step A of irradiating the outer skin of the onion with a laser under (Continued)

conditions that enable selective cutting of the outer skin, and making a cut in the outer skin; and step B of removing the outer skin with the cut from the onion, wherein the wavelength of the laser is 300 to 500 nm.

15 Claims, 6 Drawing Sheets

(51) Int. Cl.
B23K 26/38 (2014.01)
B23K 26/402 (2014.01)

(56) References Cited

FOREIGN PATENT DOCUMENTS

| | | | |
|---|---|---|---|
| JP | 2001178434 A | | 7/2000 |
| JP | 2004344037 A | * | 12/2004 |
| JP | 2005-204606 A | | 8/2005 |
| JP | 2007-135570 A | | 6/2007 |
| JP | 5787424 B1 | * | 9/2015 |
| TW | M596677 U | * | 6/2020 |
| WO | 97/27765 A1 | | 8/1997 |
| WO | 2009/104666 A1 | | 8/2009 |

OTHER PUBLICATIONS

Tw M596677 U (Liu, Shih Kun) Jun. 11, 2020 [retrieved on Oct. 10, 2025]. Retrieved from Foreign Image and Text database, translation by Clarivate Analytics (Year: 2020).*
JP 2004344037 A (Miyata Hisanori) Dec. 9, 2004 [retrieved on Oct. 10, 2025]. Retrieved from Foreign Image and Text database, translation by Clarivate Analytics (Year: 2004).*
JP 5787424 B1 (Kobayashi) Sep. 30, 2015 [retrieved on Oct. 10, 2025]. Retrieved from Foreign Image and Text database, translation by Clarivate Analytics (Year: 2015).*
WIPO, Japan International Search Authority, International Search Report and Written Opinion with English Translation mailed Sep. 5, 2023 in International Patent Application No. PCT/JP2023/026429, 10 pages.
European Patent Office, Extended European Search Report dated Dec. 8, 2025 in European Patent Application No. 23854765.7, 5 pages.

* cited by examiner (a)          (b)

(a)          (b)

(a)                              (b)

(a)                (b)

METHOD FOR REMOVING OUTER SKIN OF ONION AND DEVICE FOR REMOVING OUTER SKIN OF ONION

TECHNICAL FIELD

This invention relates to a method for removing the outer skin of the onion and a device for removing the outer skin of the onion.

BACKGROUND ART

With the recent development of the food service industry, the demand for onions has been increasing. In order to cook onions, it is necessary to remove the outer skin, and various devices have been developed to remove the outer skin from onions.

Patent Document 1 discloses an automatic onion peeling device that comprises a support plate of an onion that moves slowly in a certain direction, a root core removal member of the onion and a slitting member for making a plurality of vertical slits in the outer skin of the onion, which are located above the support plate, elevated vertically, and arranged in front and behind at a suitable interval, and a core removal cutter of the onion that is installed below the support plate in a position corresponding to the root core removal member, and the onion is placed upside down in a cylindrical support hole that opens into the onion support plate, and when the onion reaches the position of the root core removal member as the support plate moves, the root core removal member descends to remove the root core of the onion, and at the same time the core removal cutter cuts off the onion core, and then when the onion reaches the position of the slitting member, the slitting member descends to make multiple slits vertically in the outer skin of the onion (see Patent Document 1).

Patent Document 2 discloses a slit forming device that in the slit forming device for cutting a plurality of longitudinal slits at an abbreviated interval on the outer surface of an object, the device comprising: a base plate that is raised and lowered by a lifting device to approach or move away from an object set on a conveying path; an extendable center rod that is provided on the base plate and extends downward, the lower end of which abuts against an upper portion of the object as the base plate descends; a plurality of arms that are equally spaced in the circumferential direction around the center rod, extend downward, and have their upper portions pivotally attached to the base plate; a biasing means that biases the arms in an approaching direction when they pivot in a direction away from the center rod; a guide roller that is supported below the arm and has a tread surface at the lower end set below the arm and the blade portion; a blade section with a cutting edge that protrudes from the tip of the blade more toward the center rod axis than the outer circumference of the guide roller, which is fixed to the lower part of the arm via a removable cutter attachment plate that overlaps the pivot position of the guide roller, and the lower end of the center rod abuts against the upper center of the object as the base plate descends by the lifting device, and as the base plate further descends, the center rod shortens to maintain the abutment position, and the arm pivots in a direction away from or toward the center rod as the tread surface of the guide roller rolls along the outer circumferential surface of the object, and the cutting edge of the blade cuts through the outer surface of the object to form a slit (see Patent Document 2).

PRIOR ART DOCUMENT

Patent Document

Patent Document 1: JP 2007-135570 A
Patent Document 2: JP 5787424 A

SUMMARY OF THE INVENTION

Problem to be Solved by the Invention

However, the devices disclosed in Patent Document 1 and 2 cut into the edible part as well as the outer skin of the onion, resulting in the problem of removal of the edible part as well as the outer skin. In addition, because the blade also comes in contact with the edible part, the blade needs to be cleaned, and furthermore, the blade needs to be replaced periodically, making the handling of the device complicated.

An object of the present invention is to provide a method for removing an outer skin of an onion and a device for removing an outer skin of an onion that can easily remove the outer skin of the onion and suppress damage to the edible part when the outer skin is removed.

Means of Solving the Problem

A method for removing an outer skin of an onion according to the present invention, comprising:
  step A of irradiating the outer skin of the onion with a laser under conditions that enable selective cutting of the outer skin, and making a cut in the outer skin; and
  step B of removing the outer skin with the cut from the onion;
  wherein the wavelength of the laser is 300 to 500 nm.
  A device for removing an outer skin of an onion according to the present invention, comprising:
  a laser irradiation unit irradiating a laser onto the outer skin under conditions that enable selective cutting of the outer skin, and capable of making a cut in the outer skin; and
  an outer skin removal unit capable of removing the outer skin with the cut from the onion;
  wherein the wavelength of the laser is 300 to 500 nm.

Effect of the Invention

According to the present invention, a method for removing an outer skin of an onion and a device for removing an outer skin of an onion can be provided, which can easily remove the outer skin of the onion and can suppress damage to the edible part when the outer skin is removed.

MODE FOR CARRYING OUT THE INVENTION

The present invention is a method for removing an outer skin of an onion comprising: step A of irradiating the outer skin of the onion with a laser under conditions that enable selective cutting of the outer skin, and making a cut in the outer skin; and step B of removing the outer skin with the cut from the onion.

The present invention is also a device for removing an outer skin of an onion, comprising: a laser irradiation unit irradiating a laser onto the outer skin under conditions that enable selective cutting of the outer skin, and capable of making a cut in the outer skin; and an outer skin removal unit capable of removing the outer skin with the cut from the onion.

The following is a detailed description.
<The Method for Removing the Outer Skin of the Onion and the Device for Removing the Outer Skin of the Onion>
[First Embodiment of the Device for Removing the Outer Skin of the Onion]

Figure 1:
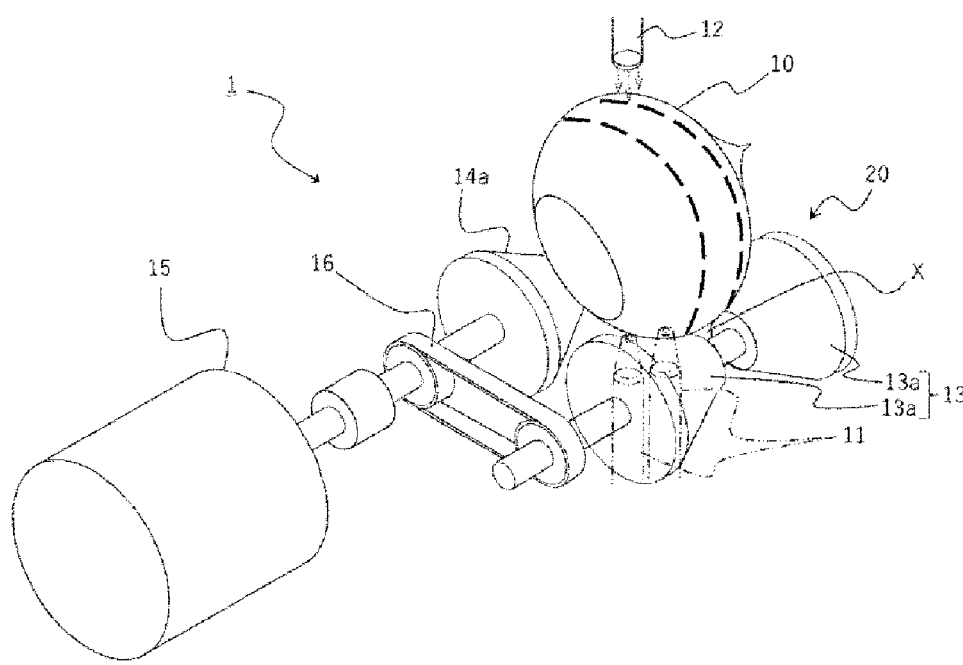
FIG. 1 is a schematic perspective view of a device for removing an outer skin according to a first embodiment of the present invention.
Figure 2:
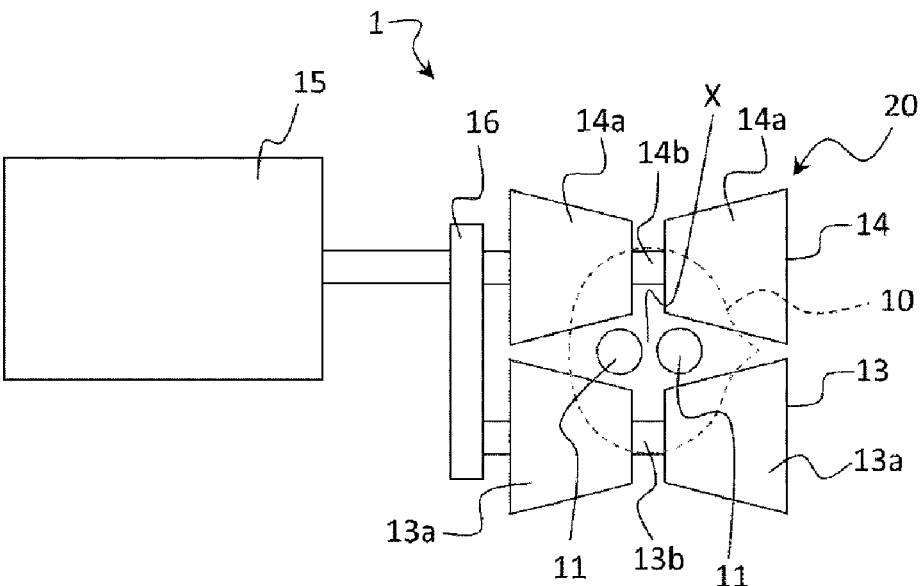
FIG. 2 is a schematic top view of the device for removing the outer skin of FIG. 1.
Figure 3:
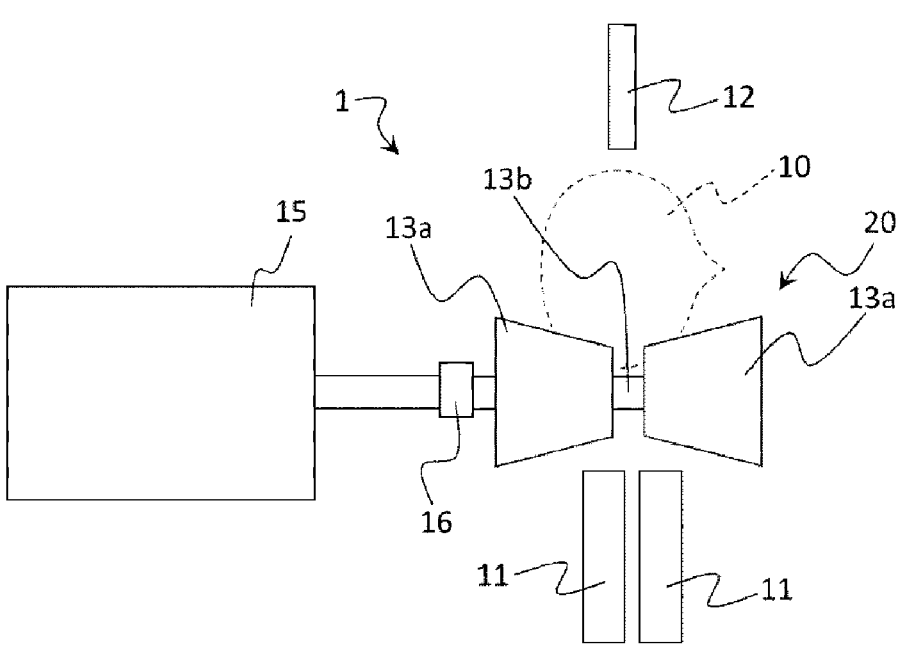
FIG. 3 is a schematic side view of the device for removing the outer skin of FIG. 1.
Figure 4:
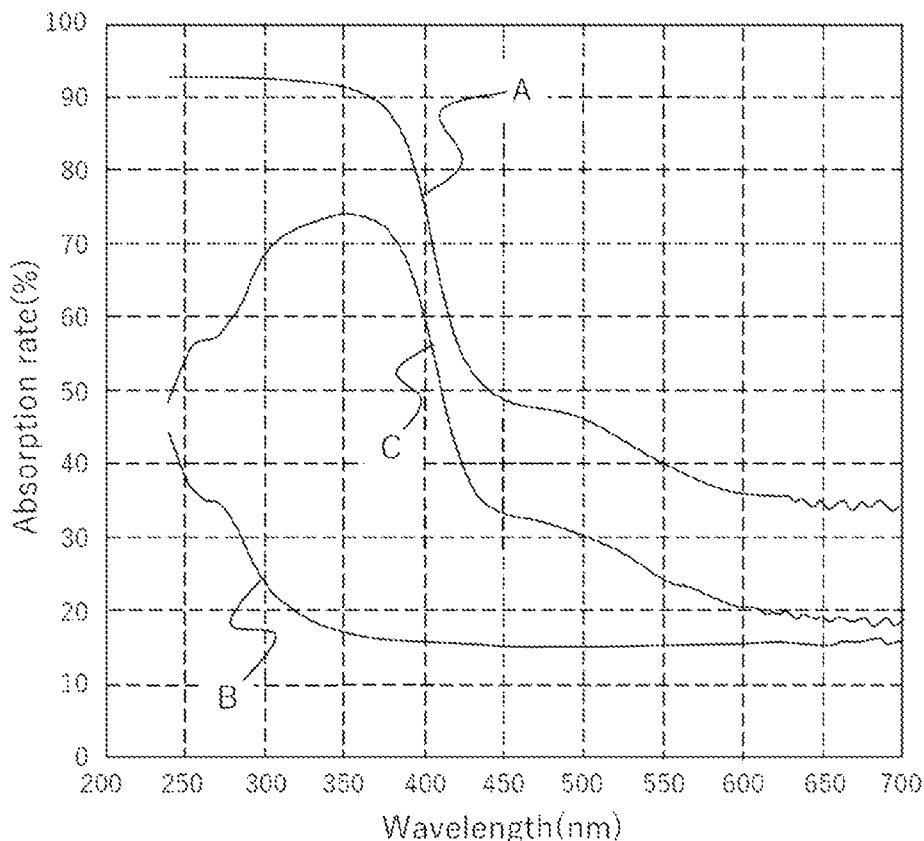
FIG. 4 is a graph showing the absorption spectra of the outer of the onion and an edible part and the difference between them.

FIG. 1 is a schematic perspective view of a device for removing an outer skin according to a first embodiment of the present invention, FIG. 2 is a schematic top view of the device for removing the outer skin of FIG. 1, FIG. 3 is a schematic side view of the device for removing the outer skin of FIG. 1, and FIG. 4 is a graph showing the absorption spectra of the outer of the onion and an edible part and the difference between them.

As shown in FIGS. 1-3, the device 1 for removing the outer skin of the onion of this embodiment comprises a laser irradiation unit 11 irradiating a laser onto the outer skin of the onion 10 under conditions that enable selective cutting of the outer skin of the onion 10, and capable of making a cut in the outer skin, an outer skin removal unit 12 capable of removing the outer skin with the cut from the onion 10, and a rotation mechanism 20 that rotates the onion 10. The method of removing the outer skin of the onion using the device 1 for removing the outer skin of the onion of this embodiment comprises step A of irradiating the outer skin of the onion 10 with a laser under conditions that enable selective cutting of the outer skin, and making a cut in the outer skin, and step B of removing the outer skin with the cut from the onion 10.

The laser irradiation unit 11 irradiates a laser onto the outer skin of the onion 10 under conditions that enable selective cutting of the outer skin of the onion, and makes a cut in the outer skin (step A). In addition, the term "selective cutting" includes not only the case where "only the outer skin is cut" but also the case where the outer skin has been cut and the edible part has minor traces of laser irradiation (minor scratches that do not go as far as cutting or minor burn marks from the laser).

By the way, since the outer skin of the onion generally contains a lot of quercetin, the absorption rate of the laser should be different between the outer skin and the edible part of the onion, depending on the wavelength of the laser. The inventors focused on this point and came up with the idea that if a laser with a wavelength that has a high absorption rate in the outer skin and a low absorption rate in the edible part is used, the effect of the laser on the edible part can be reduced and the outer skin can be selectively cut. Therefore, we measured the absorption spectra of the outer skin and the edible part of the typical onion, and obtained the relationship as shown in FIG. 4. In the graph in FIG. 4, A is the absorption spectrum curve of the outer skin, B is the absorption spectrum curve of the edible part, and C is the curve showing the difference in absorption rate between the outer skin and the edible part. From the graph in FIG. 4, it can be seen that the laser in the wavelength range of 300-500 nm has a large difference between the absorption rate in the outer skin and the absorption rate in the edible part, as well as a low absorption rate in the edible part. In other words, the wavelength of the laser irradiating the outer skin should be 300 to 500 nm, and 350 to 450 nm is more preferable. This allows the outer skin of the onion 10 to be selectively cut while suppressing the effects of laser irradiation on the edible part.

The type of laser can be a YAG laser (355 nm wavelength: third harmonic (THG)), solid-state laser (303, 355 nm wavelength: ultraviolet solid-state laser, 491 nm: blue solid-state laser), LD (semiconductor) laser (375, 405, 445, 450 nm wavelength), etc. In the configuration shown in the figure, two laser irradiation units 11 are provided, but one or three or more may be used.

It is preferable to examine and determine in advance the conditions under which the outer skin of the onion 10 can be selectively cut by a laser before the step A. In other words, it is preferable to have a condition determination step of examining and determining the conditions under which the outer skin can be selectively cut before the step A. In the condition determination step, the conditions under which the outer skin of the onion 10 can be selectively cut are examined and determined by adjusting the laser irradiation intensity, laser irradiation time, and onion rotation speed, etc., depending on the type of laser to be irradiated.

Figure 5:
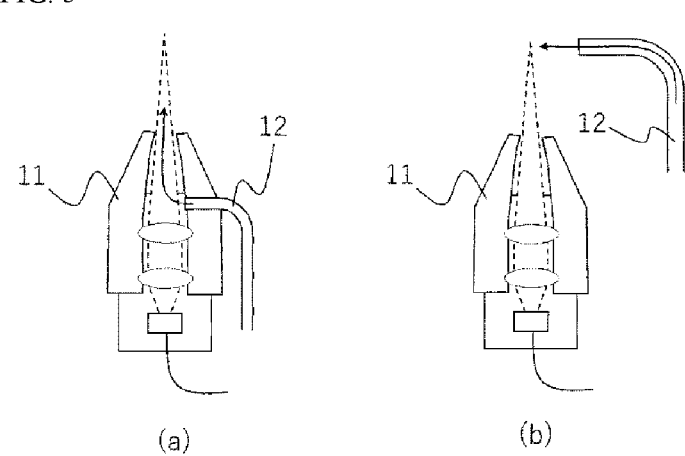
FIG. 5 is a schematic diagram showing the positional relationship between a laser irradiation unit and an outer skin removal unit.

The outer skin removal unit 12 has the function of removing the outer skin with the cut made by the laser from the onion 10 (step B). Means for removing the outer skin include, for example, air-blowing means for blowing air on the outer skin with the cut and water-blowing means for blowing water on the outer skin with the cut. Among these, it is preferable to use air-blowing means to remove the outer skin by blowing air. In this embodiment, the outer skin removal unit 12 is located at the top of the onion 10, but this is not limited to this, and for example, as shown in FIG. 5(*a*), it may be a configured to be integrated with the laser irradiation unit 11, or as shown in FIG. 5(*b*), it may be configured to blow air or water towards the laser irradiation position from the laser irradiation unit 11.

Figure 8:
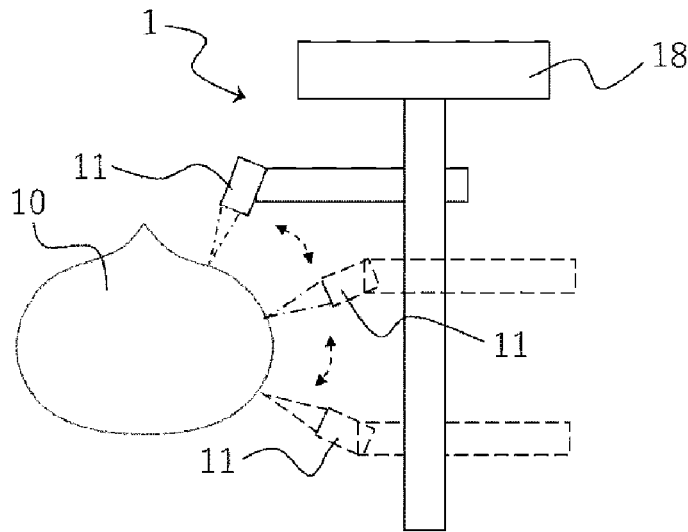
FIG. 8 is a schematic side view of a device for removing an outer skin according to a third embodiment of the present invention.

The rotation mechanism 20 has the function of rotating the onions 10. In other words, it is preferable to irradiate the laser to the outer skin while rotating the onion 10 in step A. The rotation mechanism 20 may not be necessary, in which case, as shown in FIG. 8, it is preferable that the onion 10 does not move and the laser irradiation unit moves while irradiating the laser onto the outer skin of the onion 10. The rotation mechanism 20 has a pair of rollers 13 and 14, a drive motor 15, and a drive belt 16 that synchronizes the rotation of the rollers 13 and 14.

The rollers 13 and 14 are arranged with their rotating shafts parallel in the horizontal direction. Each of the rollers 13 and 14 is configured so that the diameter decreases from both ends toward the center.

In this embodiment, as shown in FIGS. 1-3, the rollers 13 and 14 each comprise a pair of roller components 13a and 14a that are truncated cones with a gradually smaller diameter toward one side, which are arranged symmetrically with a gap in the middle so that the outer diameter is large, and are fixed to the rotating shafts 13b and 14b, respectively. The rollers 13 and 14 are arranged in series with a gap in front and back, and a depression X is formed in the center of the rollers to hold the onion 10. The power transmitted from the drive motor 15 rotates the rollers 13 and 14 in the same direction via the drive belt 16, and the onions 10 held in the central depression X of the rollers 13 and 14 are rotated opposite to the rollers 13 and 14.

In this embodiment, the laser irradiation unit 11 is arranged at the bottom of the rollers 13 and 14, and is configured to irradiate the laser onto the onion 10 through the gap between the rollers 13 and 14, specifically the depression X between the rollers 13 and 14. With this configuration, even if the onion 10 is replaced, the position of the onion 10 can be identified by the rollers 13 and 14, making it easier to estimate the distance from the laser irradiation unit 11 to the onion 10 and to focus the laser on the outer skin.

Figure 6:
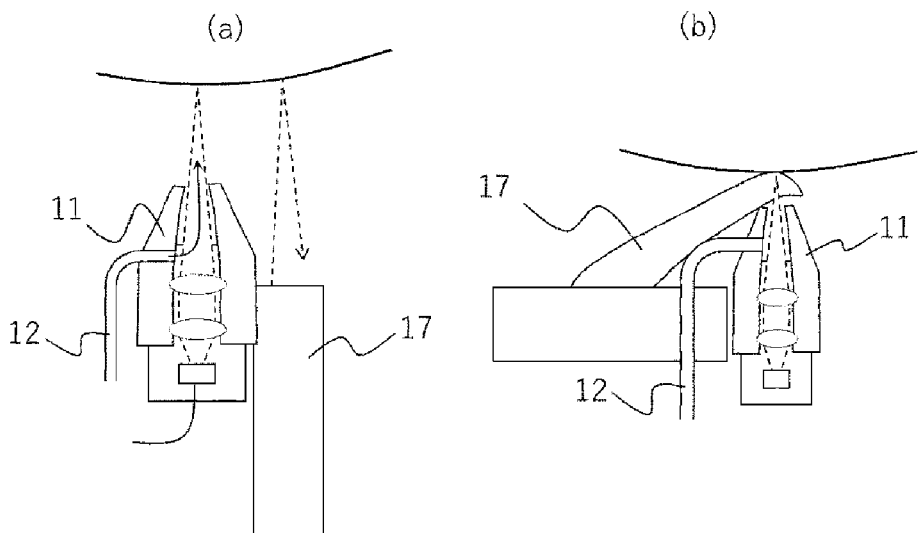
FIG. 6 is a schematic diagram showing the laser irradiation unit and a measuring means for measuring the distance to the outer skin.

In addition, the device 1 for removing the outer skin of the onion is preferably comprised of a measuring means 17 that measures the distance from the laser irradiation unit 11 to the outer skin. This makes it easier to adjust the focus of the laser irradiated from the laser irradiation unit 11. As measuring means 17, a non-contact distance measuring device such as the optical or ultrasonic type shown in FIG. 6(a) may be used, or a contact type distance measuring device such as the one shown in FIG. 6(b) comprising guide fingers may be used. The arrangement of the measuring means 17 is not limited to the configuration shown in the figure.

In addition, the method for removing the outer skin of the onion may comprise a step for removing the roots and core of the onion before or after removing the outer skin of the onion. In other words, the device 1 for removing the outer skin of the onion may comprise a root removing unit for removing the roots of the onion and a core removing unit for removing the core of the onion.

[Second Embodiment of the Device for Removing the Outer Skin of the Onion]

Figure 7:
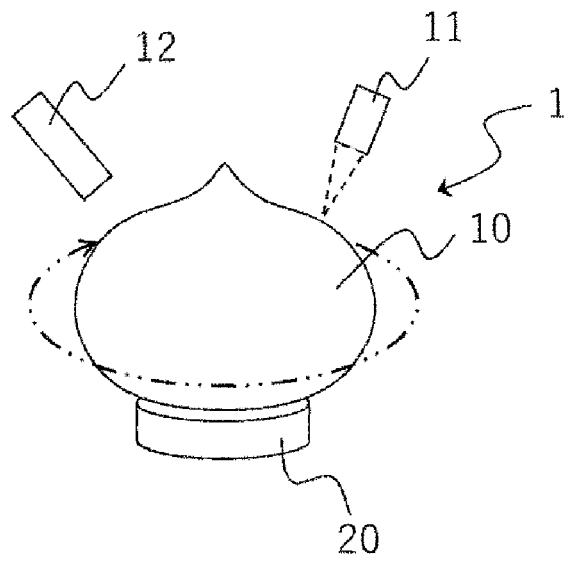
FIG. 7 is a schematic side view of a device for removing an outer skin according to a second embodiment of the present invention.

Next, a second embodiment of the device for removing the outer skin of the onion will be described. FIG. 7 is a schematic side view of a device for removing an outer skin according to a second embodiment of the present invention.

As in the first embodiment described above, the device 1 for removing the outer skin of the onion comprises a laser irradiation unit 11 that irradiates a laser to the outer skin of the onion 10 and makes a cut in the outer skin, an outer skin removal unit 12 that removes the outer skin with the cut, and a rotation mechanism 20 that rotates the onion 10.

In this embodiment, the rotation mechanism 20 is configured with a rotation table that rotates like a potter's wheel, and the onions 10 are rotated by rotating the rotation table with the onions 10 placed on the rotation table. In addition, multiple laser irradiation units 11 may be provided.

In addition, in the second embodiment of the device for removing the outer skin of the onion, it is preferable to irradiate the laser after measuring the distance from the laser irradiation unit 11 to the outer skin by the measuring means 17 as described above. This allows the focus of the laser irradiated from the laser irradiation unit 11 to be adjusted more easily.

[Third Embodiment of the Device for Removing the Outer Skin of the Onion]

Next, a third embodiment of the device for removing the outer skin of the onion will be described. FIG. 8 is a schematic side view of a device for removing an outer skin according to a third embodiment of the present invention.

As in the first embodiment described above, the device 1 for removing the outer skin of the onion of this embodiment comprises a laser irradiation unit 11 that irradiates a laser to the outer skin of the onion 10 and makes a cut in the outer skin, and an outer skin removal unit 12 (omitted in FIG. 8) that removes the outer skin with the cut.

In this embodiment, the laser irradiation unit 11 can be moved by the manipulator 18 to change the laser irradiation position on the outer skin. In other words, in this embodiment, the onion 10 does not rotate, but the laser irradiation unit 11 moves to make the cut in the outer skin.

In addition, in the third embodiment of the device for removing the outer skin of the onion, it is preferable to irradiate the laser after or while measuring the distance from the laser irradiation unit 11 to the outer skin by the measuring means 17 as described above. This allows the focus of the laser irradiated from the laser irradiation unit 11 to be adjusted more easily.

[Fourth Embodiment of the Device for Removing the Outer Skin of the Onion]

Figure 9:
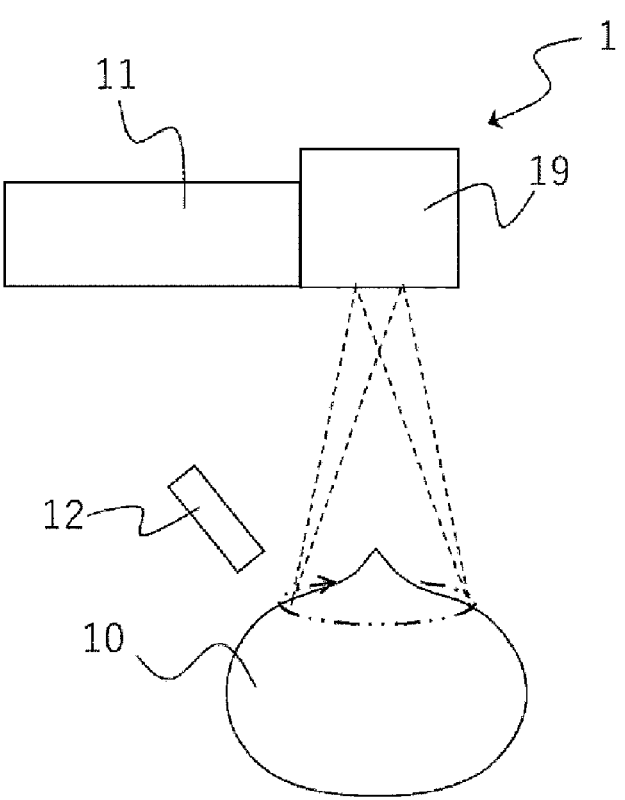
FIG. 9 is a schematic side view of a device for removing an outer skin according to a fourth embodiment of the present invention.

Next, the fourth embodiment of the onion skin removal device will be described. FIG. 9 is a schematic side view of a device for removing an outer skin according to a fourth embodiment of the present invention.

As in the first embodiment described above, the device 1 for removing the outer skin of the onion of this embodiment comprises a laser irradiation unit 11 that irradiates a laser to the outer skin of the onion 10 and makes a cut in the outer skin, and an outer skin removal unit 12 that removes the outer skin with the cut.

In this embodiment, the laser irradiation unit 11 comprises a scanning mechanism 19 for moving the laser irradiation position on the outer skin. The scanning mechanism 19 can be a general device used for laser scanning equipped with various mirrors such as galvanometer mirrors and polygon mirrors. In this embodiment, unlike the first embodiment, the onion 10 is not rotated, but the laser irradiation position is changed by laser scanning to make the cut in the outer skin.

In the device for removing the outer skin of the onion of the second embodiment, it is preferable to irradiate the laser after or while measuring the distance from the laser irradiation unit 11 to the outer skin by the measuring means 17 as described above. This allows the focus of the laser irradiated from the laser irradiation unit 11 to be adjusted more easily.

[Fifth and Sixth Embodiments of the Device for Removing the Outer Skin of the Onion]

Figure 10:
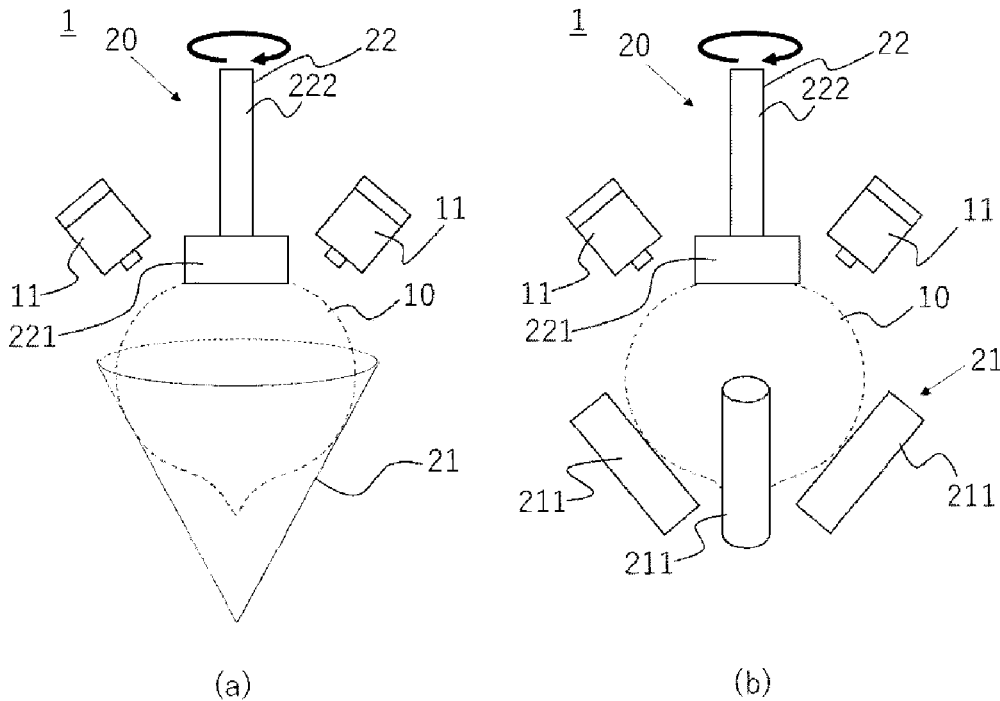
FIG. 10 is a schematic side view of devices for removing an outer skin according to a fifth (a) and a sixth (b) embodiments of the present invention.

Next, the fifth and sixth embodiments of the device for removing the outer skin of the onion will be described. FIG. 10 is a schematic side view of devices for removing an outer skin according to a fifth (a) and a sixth (b) embodiments of the present invention.

As shown in FIG. 10, the devices 1 for removing the outer skin of the onion for the fifth and sixth embodiments, as in the first embodiment described above, comprise a laser irradiation unit 11 irradiating a laser onto the outer skin of the onion 10 under conditions that enable selective cutting of the outer skin of the onion 10, and capable of making a cut in the outer skin, an outer skin removal unit 12 (not shown) capable of removing the outer skin with the cut from the onion 10, and a rotation mechanism 20 that rotates the onion 10.

In the fifth embodiment, as shown in FIG. 10(*a*), the rotation mechanism 20 comprises a holding unit 21 that holds the onion with the onion 10 sprouts down, and that can rotate with the onion 10 vertical direction as the rotating shaft, a rotating unit 22 contacting the onion 10 from the root side and rotating the onion 10 about the rotating shaft.

In the fifth embodiment, the holding unit 21 has a conical shape (inverse conical shape) with the bottom facing upward. The holding unit 21 has an opening at the bottom of the cone and is hollow so that the onion 10 can be inserted. The holding unit 21 is capable of holding the onion 10 with the buds down by inserting the onion 10 into the cavity. In addition, it is preferable that the inner walls of the cavity are processed to reduce friction with the surface of the onion. This allows the onion 10 to be rotated more smoothly. Such processing can include, for example, fluoroplastic processing or applying a highly smooth film. The shape of the holding unit 21 is not limited to a conical shape, but may be a triangular pyramid, a square pyramid, etc., a pentagonal or larger pyramid, or a truncated pyramid with the tips of these pyramids cut off.

In the fifth embodiment, the rotating unit 22 comprises a contacting part 221 that contacts the onion 10 from the root side and a rotating shaft 222 connected to the contacting part 221. The rotating shaft 222 is connected to a motor, which is not shown in the figure, and it is configured so that the rotational force of the rotating shaft 222 rotated by the motor is transmitted to the onion 10 via the contacting part 221 to rotate the onion 10.

The sixth embodiment differs from the fifth embodiment described above in that the holding unit 21 comprises a plurality of rollers 211. In the sixth embodiment, the holding unit 21 comprises four rollers 211. The four rollers 211 are inclined so that the lower end of each roller 211 is closer to the rotating shaft of the onion 10, and by such a configuration, the onion 10 is held without falling down. The rollers 211 rotate in a direction that does not impair the rotation of the onion 10 when the onion 10 rotates. In other words, the holding unit 21, which consists of four rollers 211, holds the onion 10 in a rotatable manner. The number of rollers 211 is not limited, and may be three, five or more, as long as the onion 10 can be held.

[Seventh Embodiment of the Device for Removing the Outer Skin of the Onion]

Figure 11:
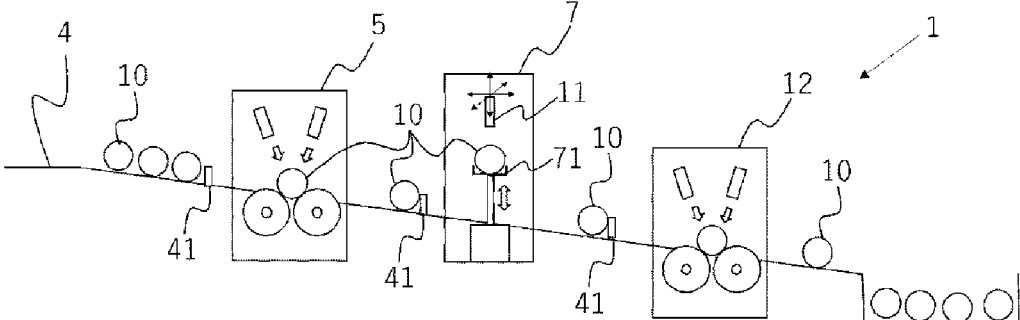
FIG. 11 is a schematic side view of a device for removing an outer skin according to a seventh embodiment of the present invention.
Figure 12:
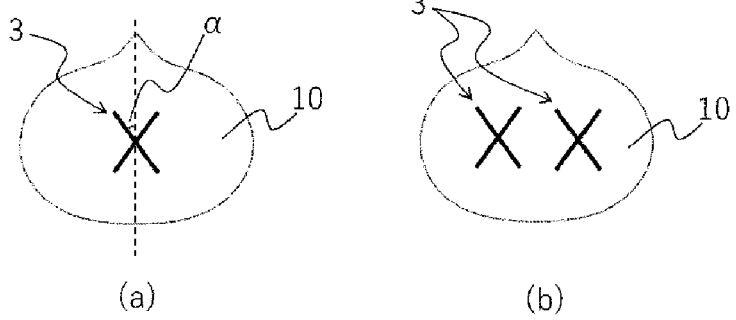
FIG. 12 is a schematic diagram showing the shape of a cut formed on an outer skin of an onion.

Next, the seventh embodiment of the device for removing the outer skin of the onion will be described. FIG. 11 is a schematic side view of a device for removing an outer skin according to a seventh embodiment of the present invention, and FIG. 12 is a schematic diagram showing the shape of a cut formed on an outer skin of an onion.

The device 1 for removing the outer skin of the onion in this embodiment comprises a laser processing unit 7 that has a laser irradiation unit 11 that irradiates a laser onto the outer skin of the onion 10 to make a cut 3 in the outer skin, and an outer skin removal unit 12 that removes the outer skin with the cut 3. In this embodiment, the laser irradiation unit 11 can be the same as in the aforementioned embodiment, but it is preferable to use a small-stroke, two- or three-shaft orthogonal processing device or scanner. The outer skin removal unit 12 can be the same as in the aforementioned embodiment.

In addition, in this embodiment, the device 1 for removing the outer skin of the onion comprises a conveying path 4 for the onion 10 and a pre-processing unit 5, as shown in FIG. 11.

In this embodiment, the conveying path 4 is inclined, and it is configured so that the onions 10 are conveyed by the weight of the onion 10. Furthermore, the conveying path 4 is configured so that a stopper 41 is provided in front of each processing unit, and an onion 10 is sent to each processing unit one at a time. The onions 10 may be conveyed using conveying means such as a belt conveyor or roller conveyor.

In the pre-processing unit 5, the pre-processing is performed to remove adhesions on the surface of the onions 10 before cut 3 is made in the outer skin (step C). By the way, adhesions such as pieces of the outer skin of the onion may exist on the surface of the onion. The presence of such adhesions may partially inhibit the cutting of the outer skin by the laser, depending on the thickness and size of the adhesions. However, by carrying out this pre-processing, it is possible to make the cut in the outer skin more reliably in step A.

Methods for removing adhesions include, for example, blowing air to remove them, blowing water to remove them, and scrubbing them off with a brush, etc. Among these methods, blowing air is preferred.

It is also preferable to perform this type of pre-processing (step C) in the first to sixth embodiments described above. This allows the removal of the outer skin to be performed more reliably in each embodiment.

The pre-processed onions 10 are then conveyed along the conveying path 4 and transported to the laser processing unit 7.

The laser processing unit 7 comprises a lifter 71 and a laser irradiation unit 11.

The lifter 71 has a function for lifting the onion 10 that have been transported to the laser processing unit 7 in the direction of the laser irradiation unit 11 and adjusting the distance between the laser irradiation unit 11 and the surface of the onion 10, as shown in FIG. 11. The laser irradiation unit 11 may also be configured to move toward the onion 10.

In this embodiment, the laser processing unit 7 is configured to make an X-shaped cut 3 in the outer skin of the onion 10 using the laser irradiation unit 11, as shown in FIG. 12. This allows more efficient removal of the outer skin in the outer skin removal unit 12.

The X-shape of the cut 3 is not limited to a shape where the cuts intersect, but as shown in FIG. 12, it is preferable to have an X-shape where the sprouts and roots are in the vertical direction. This allows more efficient removal of the outer skin in the outer skin removal unit 12.

In addition, when the cut 3 is an X-shaped cut with the sprout and root in the vertical direction, it is preferable that the angle (a in FIG. 12) between the vertical direction connecting the sprout and root of the onion 10 and the single cut that makes up the cut 3 is less than 45°, more preferred that it be 20-42°, and furthermore, 25-40°. When the angle α is in this range, the length of the X-shaped cut 3 in the vertical direction is longer than that in the horizontal direction, so when removing the outer skin, it will first peel off in a large vertical direction and then peel off in a horizontal direction. As a result, the outer skin can be removed more efficiently. On the other hand, if the length of the X-shaped cut 3 is shorter in the vertical direction than in the horizontal direction, the outer skin may start to peel off in the horizontal direction first, and the area around the sprouts and roots may remain.

In addition, the X-shaped cut 3 may be attached to the onion 10 as shown in FIG. 12(*a*) with one piece, as shown in FIG. 12(*b*) with two pieces, or with three or more pieces, but it is preferable to be attached to the onion 10 with two or more pieces. This allows more efficient removal of the outer skin in the outer skin removal unit 12.

The onion 10 with the cut 3 is conveyed along the conveying path 4 and taken to the outer skin removal unit 12, where the outer skin is removed in the same way as in the above-mentioned embodiments.

According to the method for removing the outer skin of the onion and the device 1 for removing the outer skin of the onion described above, the outer skin of the onion can be easily removed, and damage to the edible part can be suppressed when removing the outer skin.

The above describes a suitable embodiment of the method for removing the outer skin of the onion and the device for removing the outer skin of the onion, but the present invention is not limited to this.

EXAMPLES

Cutting tests of onion skin and edible parts were conducted under the following conditions.

Test Example 1

Laser irradiation unit used: 445 nm semiconductor laser
Laser output: 10 W
Processing speed (the laser irradiation unit movement speed): 60 mm/sec.
Number of irradiations: 3 times
Other conditions and results are shown in Table 1. The test was conducted with the first layer of the outer skin facing the laser irradiation side.

TABLE 1

|  | thickness [mm] | Condition |
| --- | --- | --- |
| Outer skin (First layer) | 0.083 | Cutting |
| Outer skin (Second layer) | 0.065 | Cutting |
| Outer skin (Third layer) | 0.069 | Cutting |
| Edible part | — | Thin line remains |

Test Example 2

Laser irradiation unit used: 445 nm semiconductor laser
Laser output: 20 W
Processing speed (the laser irradiation unit movement speed): 60 mm/sec
Number of irradiations: 3 times
Other conditions and results are shown in Table 2. The test was conducted with the first layer of the outer skin facing the laser irradiation side.

TABLE 2

|  | thickness [mm] | Condition |
| --- | --- | --- |
| Outer skin (First layer) | 0.273 | Cutting |
| Outer skin (Second layer) | 0.190 | Cutting |
| Edible part | — | No visible damage |

From Tables 1 and 2, it can be seen that the method of the present invention can be used to selectively cut the outer skin.

When onions with cuts made in the outer skin using a cutter and onions with cuts made in the outer skin using a laser under the conditions of Test Example 2 were left at room temperature for 3 months, the former onions showed signs of decay and drying due to damage to the edible parts at the cut sections, but the latter onions showed no noticeable changes in either the outer skin or the edible parts.

This specification discloses at least the following inventions.

[1] A method for removing an outer skin of an onion, comprising:
    step A of irradiating the outer skin of the onion with a laser under conditions that enable selective cutting of the outer skin, and making a cut in the outer skin; and
    step B of removing the outer skin with the cut from the onion.

[2] The method for removing the outer skin of the onion according to [1], wherein the wavelength of the laser is 300 to 500 nm.

[3] The method for removing the outer skin of the onion according to [1] or [2], wherein in step B, air is blown to remove the outer skin with the cut from the onion.

[4] The method for removing the outer skin of onions according to [1]-[3], wherein in step A, the onion is irradiated with the laser to the outer skin while rotating the onion.

[5] The method for removing the outer skin of the onion according to [1]-[4], wherein in step A, the laser is irradiated to the outer skin while scanning the laser.

[6] The method for removing the outer skin of the onion according to [1]-[5], wherein in step A, a measurement step is performed to measure the distance from a laser irradiation unit irradiating the laser to the outer skin.

[7] The method for removing the outer skin of the onion according to [1]-[6], wherein the cut is X-shaped.

[8] The method for removing the outer skin of the onion according to [1]-[7], wherein prior to step A, a pre-processing step C is performed to remove adhesions on the surface of the onion.

[9] A device for removing an outer skin of an onion, comprising:
    a laser irradiation unit irradiating a laser onto the outer skin under conditions that enable selective cutting of the outer skin, and capable of making a cut in the outer skin; and
    an outer skin removal unit capable of removing the outer skin with the cut from the onion.

[10] The device for removing the outer skin of the onion according to [9], wherein the wavelength of the laser is 300 to 500 nm.

[11] The device for removing the outer skin of the onion according to claim [9] or [10], wherein the outer skin removal unit has an air blowing means that blows air onto the outer skin with the cut.

[12] The device for removing the outer skin of the onion according to [9]-[11], wherein furthermore, comprising a rotation mechanism that rotates the onion.

[13] The device for removing the outer skin of the onion according to [12], wherein the rotation mechanism comprises a pair of rollers with a rotating shaft arranged parallel to the horizontal direction,
    each of the pair of rollers is configured so that the diameter decreases from both ends toward the center, the laser irradiation device is disposed at a position where the laser is irradiated onto the onion through a gap between the pair of rollers.

[14] The device for removing the outer skin of the onion according to [12], wherein the rotation mechanism comprises a holding unit that holds the onion with the onion sprouts down, and that can rotate with the onion's vertical direction as a rotating shaft, the rotating unit contacting the onion from the root side and rotating the onion about the rotating shaft.

[15] T The device for removing the outer skin of the onion according to [9]-[14], wherein the laser irradiation unit comprises a scanning mechanism for moving the laser irradiation position on the outer skin.

[16] The device for removing the outer skin of the onion according to [9]-[15], wherein furthermore, comprising a measuring means for measuring a distance from the laser irradiation unit to the outer skin.

[17] The device for removing the outer skin of the onion according to [9]-[16], wherein comprising a pre-processing unit for removing adhesions on the surface of the onion.

DESCRIPTION OF NUMERALS 1 device for removing outer skin of onion
10 onion
11 laser irradiation unit
12 outer skin removal unit
13, 14 roller
13a, 14a roller component
13b, 14b rotating shaft
15 drive motor
16 drive belt
17 measuring means
18 manipulator
19 scanning mechanism
20 rotation mechanism
21 holding unit
22 rotating unit
211 roller
221 contacting part
222 rotating shaft
3 cut
4 conveying path
41 stopper
5 pre-processing unit
7 laser processing unit
71 lifter
X depression
α angle

What is claimed is:

1. A method for removing an outer skin of an onion, comprising:

step A of irradiating the outer skin of the onion with a laser under conditions that enable selective cutting of the outer skin, and making a cut in the outer skin; and step B of removing the outer skin with the cut from the onion;

wherein a wavelength of the laser is 375 to 500 nm, and wherein a type of the laser is a semiconductor laser.

2. The method for removing the outer skin of the onion according to claim 1, wherein in step B, air is blown to remove the outer skin with the cut from the onion.

3. The method for removing the outer skin of onions according to claim 1, wherein in step A, the onion is irradiated with the laser to the outer skin while rotating the onion.

4. The method for removing the outer skin of the onion according to claim 1, wherein in step A, the laser is irradiated to the outer skin while scanning the laser.

5. The method for removing the outer skin of the onion according to claim 1, wherein in step A, a measurement step is performed to measure a distance from a laser irradiation unit irradiating the laser to the outer skin.

6. The method for removing the outer skin of the onion according to claim 1, wherein the cut is X-shaped.

7. The method for removing the outer skin of the onion according to claim 1, wherein prior to step A, a pre-processing step C is performed to remove adhesions on a surface of the onion.

8. A device for removing an outer skin of an onion, comprising:

a laser irradiation unit irradiating a laser onto the outer skin under conditions that enable selective cutting of the outer skin, and capable of making a cut in the outer skin; and an outer skin removal unit capable of removing the outer skin with the cut from the onion;

wherein a wavelength of the laser is 375 to 500 nm, and wherein a type of the laser is a semiconductor laser.

9. The device for removing the outer skin of the onion according to claim 8, wherein the outer skin removal unit has an air blowing means that blows air onto the outer skin with the cut.

10. The device for removing the outer skin of the onion according to claim 9, further comprising a rotation mechanism that rotates the onion.

11. The device for removing the outer skin of the onion according to claim 10, wherein the rotation mechanism comprises a pair of rollers with a rotating shaft arranged parallel to a horizontal direction, each of the pair of rollers is configured so that a diameter decreases from both ends toward a center, the laser irradiation unit is disposed at a position where the laser is irradiated onto the onion through a gap between the pair of rollers.

12. The device for removing the outer skin of the onion according to claim 10, wherein the rotation mechanism comprises:

a holding unit that holds the onion with the onion sprouts down, and that can rotate with the onion's vertical direction as a rotating shaft, and a rotating unit contacting the onion from a root side and rotating the onion about the rotating shaft.

13. The device for removing the outer skin of the onion according to claim 8, wherein the laser irradiation unit comprises a scanning mechanism for moving a laser irradiation position on the outer skin.

14. The device for removing the outer skin of the onion according to claim 8, further comprising a measuring means for measuring a distance from the laser irradiation unit to the outer skin.

15. The device for removing the outer skin of the onion according to claim 8, further comprising a pre-processing unit for removing adhesions on a surface of the onion.

* * * * *